(12) United States Patent
Leng et al.

(10) Patent No.: US 10,759,892 B2
(45) Date of Patent: Sep. 1, 2020

(54) TRIMERIZATION CATALYSTS FROM STERICALLY HINDERED SALTS AND TERTIARY AMINES HAVING ISOCYANATE REACTIVE GROUPS

(71) Applicant: Evonik Operations GmbH, Essen (DE)

(72) Inventors: Boxun Leng, Shanghai (CN); Juan Jesus Burdeniuc, Colmar, PA (US); James Douglas Tobias, Center Valley, PA (US); Robert Hoffman, Alburtis, PA (US); Xiubing Hu, Shanghai (CN)

(73) Assignee: Evonik Operations GmbH, Essen (DE)

( * ) Notice: Subject to any disclaimer, the term of this patent is extended or adjusted under 35 U.S.C. 154(b) by 211 days.

(21) Appl. No.: 15/735,716

(22) PCT Filed: Jun. 18, 2015

(86) PCT No.: PCT/CN2015/081809
§ 371 (c)(1),
(2) Date: Dec. 12, 2017

(87) PCT Pub. No.: WO2016/201675
PCT Pub. Date: Dec. 22, 2016

(65) Prior Publication Data
US 2018/0179318 A1 Jun. 28, 2018

(51) Int. Cl.
| | |
|---|---|
| *C08G 18/09* | (2006.01) |
| *C08G 18/76* | (2006.01) |
| *C08G 18/16* | (2006.01) |
| *C08G 18/18* | (2006.01) |
| *C08G 18/22* | (2006.01) |
| *C08G 18/42* | (2006.01) |
| *C08J 9/06* | (2006.01) |
| *C08G 101/00* | (2006.01) |

(52) U.S. Cl.
CPC ......... *C08G 18/092* (2013.01); *C08G 18/163* (2013.01); *C08G 18/1808* (2013.01); *C08G 18/1825* (2013.01); *C08G 18/225* (2013.01); *C08G 18/42* (2013.01); *C08G 18/7664* (2013.01); *C08J 9/06* (2013.01); *C08G 2101/0025* (2013.01); *C08J 2205/10* (2013.01); *C08J 2207/00* (2013.01)

(58) Field of Classification Search
CPC .... B01J 31/0237; B01J 31/0245; B01J 31/12; B01J 35/0006; B01J 2531/13; C08J 18/092; C08J 18/163; C08J 18/1808; C08J 18/1825; C08J 18/225; C08J 18/42; C08J 18/7664; C08J 2101/0025; C08J 9/06; C08J 2205/10; C08J 2207/00
See application file for complete search history.

(56) References Cited

U.S. PATENT DOCUMENTS

| | | | | |
|---|---|---|---|---|
| 4,353,995 | A | 10/1982 | Szabat et al. | |
| 5,691,440 | A * | 11/1997 | Katz | B01J 31/0239 252/182.2 |
| 6,590,057 | B1 | 7/2003 | Brecht et al. | |
| 2002/0120089 | A1* | 8/2002 | Kohlstruk | B01J 31/0278 528/52 |
| 2005/0267227 | A1* | 12/2005 | Andrew | C08G 18/165 521/99 |
| 2008/0312351 | A1* | 12/2008 | Burdeniuc | C08G 18/092 521/113 |
| 2014/0113984 | A1 | 4/2014 | Burdeniuc et al. | |

FOREIGN PATENT DOCUMENTS

| | | |
|---|---|---|
| CN | 100344665 C | 10/2007 |
| CN | 101323659 A | 12/2008 |
| JP | S55118913 A | 9/1980 |
| WO | 2010123118 A1 | 10/2010 |

OTHER PUBLICATIONS

European Search Report dated Jan. 16, 2019 corresponding to European Application No. 15895248.1 filed Dec. 14, 2017 (6 pages).
PCT International Search Report dated Dec. 29, 2015 corresponding to PCT Application No. PCT/CN2015/081809 filed Jun. 18, 2015. (3 pages).

* cited by examiner

*Primary Examiner* — John M Cooney
(74) *Attorney, Agent, or Firm* — Andrew H. Chung; Linda S. Li; Jason S. Ngui

(57) ABSTRACT

The present invention provides trimerization catalyst compositions having a sterically hindered carboxylate salt used in combination with a tertiary amine catalysts having isocyanate reactive groups and methods to produce a polyisocyanurate/polyurethane foam using such trimerization catalyst compositions.

16 Claims, 3 Drawing Sheets

TRIMERIZATION CATALYSTS FROM STERICALLY HINDERED SALTS AND TERTIARY AMINES HAVING ISOCYANATE REACTIVE GROUPS

This Application is a § 371 national stage of PCT International Application No. PCT/CN2015/081809, filed Jun. 18, 2015, the contents of which are hereby incorporated by reference in their entirety into this application.

FIELD OF THE INVENTION

The present invention relates generally to catalyst systems, compositions comprising catalyst systems, polyisocyanurate/polyurethane (PIR/PUR) foam formulations, and methods of making PIR/PUR foams.

BACKGROUND OF THE INVENTION

Typically, polyisocyanurate/polyurethane (PIR/PUR) foams are made by reacting a polyol and a polyisocyanate in the presence of a catalyst. Additional additives can be present. PIR/PUR foam products have excellent thermal stability and flame resistance. Isocyanurates retain their strength to temperatures of about 160° C. and are resistant to most organic solvents, acids, alkali, ultraviolet light, and humidity.

Certain carboxylate salts, such as, for example, certain alkali metal carboxylate salts, have been used as catalysts in the production of PIR/PUR foams. The use of commercially available alkali metal carboxylate salt catalysts, however, often leads to undesirable foam processing problems which are particularly significant in continuous foam operations. A distinctive "step" is observed, which is normally associated with the onset of the trimerization process, when measuring the rise speed profile of the foam, or by plotting the foam height versus time. This trimerization "step" causes a significant change in the speed of the foam rise; in essence, the foam expands at two different rates during the foaming process. In a continuous polyisocyanurate/polyurethane foam lamination operation, it is difficult to adjust the speed of the production unit to match the change in the speed of the foam rise. The result can be foam overpacking or foam back flow. This undesirable rapid rise in foam height is particularly troublesome when processing polyisocyanurate/polyurethane formulations at a high Isocyanate Index. That is, the change in the rate of foam rise is much more dramatic at a higher Isocyanate Index. Consequently, it is a technical challenge to produce desirable low flammability foam products, with a high isocyanate index, when using conventional alkali metal carboxylate salt catalysts.

As compared to alkali metal carboxylate salt catalysts, commercially available polyisocyanurate trimerization catalysts based on hydroxyalkylammonium carboxylate salts show different processability in continuous operations. They provide a smoother rate of rise profile and have a less significant trimerization "step." That is, the rate of foam rise is more consistent, even at a higher Isocyanate Index. However, hydroxyalkylammonium carboxylate salt catalysts can be unstable at temperatures above about 100° C., decomposing into volatile amine by-products. This decomposition process causes the release of volatile amines and can impart an undesirable amine odor to finished foam products. The polymerization reactions that produce PIR/PUR foam are highly exothermic, often leading to foam processing temperatures in excess of 100° C. Hence, hydroxyalkylammonium carboxylate salt catalysts can provide more predictable foam processability, but sometimes at the expense of a foam product with an undesirable amine odor.

Thus, there exists a need for a catalyst composition and a foam formulation that can offer a smooth rise profile—foam height versus time—for producing PIR/PUR foams in continuous operations. Further, there exists a need for a catalyst composition that performs well in foam formulations with a high Isocyanate Index (e.g., an Index of about 100 to about 800). At the same time, such catalyst composition should provide equivalent or faster surface cure when compared to commercially available catalyst systems, such that the foam products made with the catalyst composition can have reduced surface friability (e.g., improved hardness) and enhanced surface adherence during the manufacture of finished products such as laminated foam panels. Optionally, depending upon the selection of the catalyst components, the catalyst composition can be thermally stable at the temperatures which PIR/PUR foams normally encounter during manufacturing, and produce foams that are substantially free of volatile amines and/or amine odors.

BRIEF SUMMARY OF THE INVENTION

The present invention solves the previously identified problems with conventional catalyst and provides a novel catalyst composition for producing a PIR/PUR foam comprising at least one sterically hindered carboxylate salt used in combination with a tertiary amine catalysts having isocyanate reactive groups. At least one sterically hindered carboxylate salt having the formula:

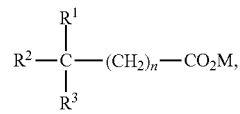

wherein:
R$^1$, R$^2$, and R$^3$ are selected independently from a C$_1$-C$_{18}$ alkyl, alkenyl, aryl, or aralkyl, any of which are substituted or unsubstituted;
n is an integer from 0 to 10, inclusive; and
M is an alkali metal ion or a quaternary ammonium ion is used in combination with at least one tertiary amine having at least one isocyanate reactive group comprising a primary hydroxyl group, a secondary hydroxyl group, a primary amine group, a secondary amine group, a urea group or an amide group. The wt % ratio of sterically hindered carboxylate salt (neat free of solvent) to at least one tertiary amine having at least one isocyanate reactive group (neat sterically hindered carboxylate salt free of solvent+ tertiary amine having at least one isocyanate reactive group=100%) will range from about 95% to about 5%, typically from about 80% to about 10% and more typically from about 70% to about 30%.

In another aspect, the present invention discloses a composition comprising the contact product of at least one active hydrogen-containing compound, a catalyst composition comprising at least one sterically hindered carboxylate salt and at least one tertiary amine, and at least one blowing agent, with the proviso that the at least one blowing agent is not a chlorofluorocarbon (CFC). Further, the present invention also discloses a composition comprising the contact product of at least one polyisocyanate, a catalyst composition comprising at least one sterically hindered carboxylate salt in combination with a tertiary amine having an isocyanate reactive group comprising a primary hydroxyl group, a secondary hydroxyl group, a primary amine group, a secondary amine group, a urea group or an amide group, and at least one blowing agent, with the proviso that the at least one blowing agent is not a chlorofluorocarbon (CFC).

The present invention also provides a method for preparing polyisocyanurate/polyurethane (PIR/PUR) foam. This method comprises contacting at least one polyisocyanate with at least one active hydrogen-containing compound, in the presence of at least one blowing agent, with the proviso that the at least one blowing agent is not a CFC, and an effective amount of a catalyst composition comprising at least one sterically hindered carboxylate salt in combination with a tertiary amine having an isocyanate reactive group.

The catalyst composition of the present invention offers a substantially consistent foam height rise versus time—even at a high Isocyanate Index—and can provide an equivalent or faster surface cure during the preparation of PIR/PUR foams. In another aspect of the present invention, the catalyst composition can be thermally stable at standard foam processing temperatures, producing PIR/PUR foams which are substantially free of volatile amines and/or amine odors.

The various aspects and embodiments herein can be used alone or in combinations with each other.

DEFINITIONS

Figure 1:
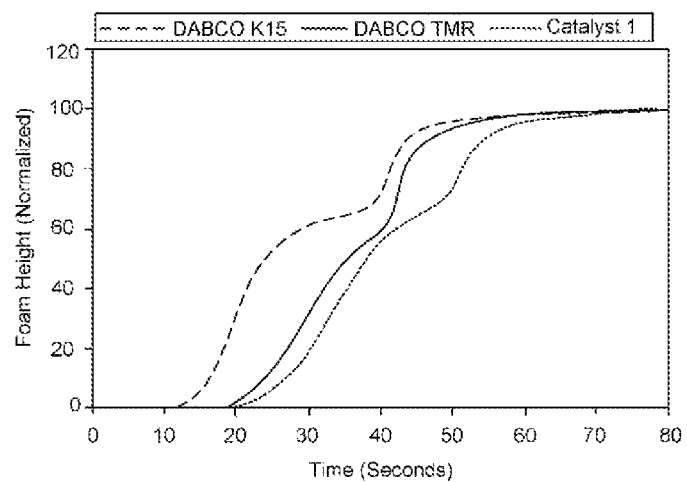
FIG. 1 is a plot of foam height versus time for a foam produced in accordance with Example 4.

The following definitions are provided in order to aid those skilled in the art in understanding the detailed description of the present invention.

PIR—Polyisocyanurate.
PUR—Polyurethane.
Isocyanate Index—The actual amount of polyisocyanate used divided by the theoretically required stoichiometric amount of polyisocyanate required to react with all the active hydrogen in the reaction mixture, multiplied by 100. Also known as (Eq NCO/Eq of active hydrogen)×100.
pphp—parts by weight per hundred weight parts polyol.
DABCO® K15 catalyst from Air Products and Chemicals, Inc. (APCI) is a 70% solution of an alkali metal carboxylate salt, potassium 2-ethylhexanoate (also known potassium octoate), in diethylene glycol.
DABCO TMR® catalyst from APCI is a 75% solution of 2-hydroxypropyltrimethylammonium octoate in ethylene glycol Polycat® 5 catalyst from APCI is a urethane catalyst, known chemically as pentamethyldiethylenetriamine.

DETAILED DESCRIPTION OF THE INVENTION

The present invention is directed to a novel catalyst composition comprising at least one sterically hindered carboxylate salt in combination with a tertiary amine having an isocyanate reactive group. This novel catalyst system can be used as a polyisocyanate trimerization catalyst system for producing polyisocyanurate/polyurethane (PIR/PUR) foams. Further, the present invention also is directed to novel compositions comprising the contact product of at least one active hydrogen-containing compound, at least one blowing agent, and a catalyst composition comprising at least one sterically hindered carboxylate salt in combination with a tertiary amine having an isocyanate reactive group. Additionally, the present invention is directed to novel compositions comprising the contact product of at least one polyisocyanate, at least one blowing agent, and a catalyst composition comprising at least one sterically hindered carboxylate salt in combination with a tertiary amine having an isocyanate reactive group. These novel compositions can be used together with additional components to produce PIR/PUR foams.

Also, the present invention provides a method for preparing a PIR/PUR foam which comprises contacting at least one polyisocyanate with at least one active hydrogen-containing compound in the presence of at least one blowing agent and an effective amount of a catalyst composition comprising at least one sterically hindered carboxylate salt in combination with a tertiary amine having an isocyanate reactive group. Additionally, rigid PIR/PUR foams can be produced with the novel catalyst system and novel compositions of the present invention by several methods known within the art.

A catalyst composition comprising at least one sterically hindered carboxylate salt in combination with a tertiary amine having an isocyanate reactive group can be used to trimerize isocyanates to produce isocyanurates. Generally, any amount of the at least one sterically hindered carboxylate salt in combination with a tertiary amine having an isocyanate reactive group can be used in the compositions of the present invention. As used in practice, catalyst systems for PIR/PUR foams typically include solutions of carboxylate salts in, for example, a diluent such as ethylene glycol, diethylene glycol, polyethylene glycol, dimethylsulfoxide (DMSO), pyrrolidone, propylene glycol, dipropylene glycol, and polypropylene glycol. The amount of diluent can range from about 5% to about 90%, about 10% to about 80% and in some cases about 20% to about 70% wt. % of the catalyst. When a quantity by weight of the catalyst composition of the present invention is discussed, the quantity will exclude the diluent, unless stated otherwise. As an example, if 10 grams of a 50% solution of potassium pivalate catalyst in ethylene glycol were used in a given application, the amount of the potassium pivalate salt catalyst would equal 5 grams. Hence, 5 grams of that catalyst component would be used in calculating any weight ratios of that component in relation to, for example, the amount of active hydrogen-containing compound or the amount of polyol.

Applicants disclose several types of ranges in the present invention. These include, but are not limited to, a range of temperatures; a range of number of atoms; a range of foam density; a range of Isocyanate Index; and a range of pphp for the blowing agent, water, surfactant, flame retardant, and catalyst composition comprising at least one sterically hindered carboxylate salt in combination with a tertiary amine having an isocyanate reactive group. When Applicants disclose or claim a range of any type, Applicants' intent is to disclose or claim individually each possible number that such a range could reasonably encompass, as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that "$R^1$" can be an alkyl group having up to 18 carbon atoms, or in alternative language a $C_1$ to $C_{18}$ alkyl group, as used herein, refers to a "$R^1$" group that can be selected independently from an alkyl group having 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ alkyl group), and also including any combination of ranges between these two numbers (for example, a $C_3$ to $C_5$ and $C_7$ to $C_{10}$ alkyl group). Likewise, this applies to all other carbon ranges disclosed herein, for example, $C_1$ to $C_{18}$ ranges for $R^2$ and $R^3$; alkoxy groups having up to 10 carbon atoms; etc.

Similarly, another representative example follows for the parts by weight of the catalyst composition comprising at least one sterically hindered carboxylate salt in combination with a tertiary amine having an isocyanate reactive group per hundred weight parts of the at least one active hydrogen-containing compound in a composition or a foam formulation. If the at least one active hydrogen-containing compound is an at least one polyol, the parts by weight per hundred weight parts polyol is abbreviated as pphp. Hence, by the disclosure that the catalyst composition comprising at least one sterically hindered carboxylate salt is present in an amount from about 0.05 to about 10 pphp, for example, Applicants intend to recite that the pphp can be selected from about 0.05, about 0.06, about 0.07, about 0.08, about 0.09, about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, or about 10. Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

Although not required, another aspect of the present invention provides a thermally stable catalyst system. When used to describe this feature, a compound is defined as thermally stable at a given temperature when it does not decompose or release volatile amines and/or related amine odors at the given temperature. The inventive catalyst composition are thermally stable up to a temperature of about 120° C., about 120° C. and in some cases about 120° C. In a further aspect, the catalyst system of the present invention has thermal stability up to about 175° C., about 200° C., about 220° C., about 240° C., or about 250° C. In one aspect of the invention, the thermally stability of a catalyst can be improved by employing the instant invention (e.g., the thermal stability of a 75% solution of 2-hydroxypropyltrimethylammonium octoate in ethylene glycol is improved by being combined with a tertiary amine of the invention).

In another aspect of the invention, the catalyst compositions can be used to obtain a foam having desirable hardness properties (e.g., as illustrated in the instant Examples). The foam can have a hardness of about 250 Newtons to about 600 Newtons, about 300 Newtons to about 550 Newtons and in some cases about 350 Newtons to about 500 Newtons when measured in accordance with the procedures outline in Example 2.

In one aspect of the invention, sterically hinder carboxylate salts comprise at least one member selected from the group consisting of salts with thermal stability include, but are not limited to, potassium pivalate, sodium pivalate, lithium pivalate, potassium triethylacetate, sodium triethylacetate, lithium triethylacetate, potassium neoheptanoate, sodium neoheptanoate, lithium neoheptanoate, potassium neooctanoate, sodium neooctanoate, lithium neooctanoate, potassium neodecanoate, sodium neodecanoate, lithium neodecanoate and the like. Such salts can be employed individually or in any combination thereof.

In another aspect of the invention, sterically hindered carboxylate salts with alkali metal ions, for example, lithium, sodium, potassium, and rubidium, are thermally stable catalyst compositions within the scope of the present invention. Quaternary ammonium salts with thermal stability include, but are not limited to, tetramethylammonium pivalate, tetraethylammonium pivalate, tetrapropylammonium pivalate, tetrabutylammonium pivalate, tetramethylammonium triethylacetate, tetraethylammonium triethylacetate, tetrapropylammonium triethylacetate, tetrabutylammonium triethylacetate, tetramethylammonium neoheptanoate, tetraethylammonium neoheptanoate, tetrapropylammonium neoheptanoate, tetrabutylammonium neoheptanoate, tetramethylammonium neooctanoate, tetraethylammonium neooctanoate, tetrapropylammonium neooctanoate, tetrabutylammonium neooctanoate, tetramethylammonium neodecanoate, tetraethylammonium neodecanoate, tetrapropylammonium neodecanoate, tetrabutylammonium neodecanoate, and the like. Such salts can be employed individually or in any combination thereof.

The sterically hindered carboxylate salt is used in combination with at least one tertiary amine having at least one isocyanate reactive group comprising a primary hydroxyl group, a secondary hydroxyl group, a primary amine group, a secondary amine group, a urea group or an amide group. Example of tertiary amine catalyst having an isocyanate group include, but are not limited to N, N-bis(3-dimethylaminopropyl)-N-isopropanolamine, N, N-dimethylaminoethyl-N'-methyl ethanolamine, N, N, N'-trimethylaminopropylethanolamine, N, N-dimethylethanolamine, N, N-diethylethanolamine N, N-dimethyl-N', N'-2-hydroxy (propyl)-1, 3-propylenediamine,dimethylaminopropylamine, (N, N-dimethylaminoethoxy) ethanol, methyl-hydroxyethyl-piperazine, bis(N, N-dimethyl-3-aminopropyl) amine, N, N-dimethylaminopropyl urea, diethylaminopropyl urea, N, N'-bis(3-dimethylaminopropyl)urea, N, N'-bis(3-diethylaminopropyl)urea, bis(dimethylamino)-2-propanol, 6-dimethylamio-1-hexanol, N-(3-aminopropyl) imidazole, N-(2-hydroxypropyl) imidazole, and N-(2-hydroxyethyl) imidazole, 2-[N-(dimethylaminoethoxyethyl)-N-methylamino] ethanol, N, N-dimethylaminoethyl-N'-methyl-N'-ethanol, dimethylaminoethoxyethanol, N, N, N'-trimethyl-N'-3-aminopropyl-bis(aminoethyl) ether, or a combination thereof.

The inventive catalyst can also be acid blocked with an acid including carboxylic acids (alkyl, substituted alkyl, alkylene, aromatic, substituted aromatic) sulfonic acids or any other organic or inorganic acid. Examples of carboxylic acids include mono-acids, di-acids or poly-acids with or without isocyanate reactive groups. Examples of carboxylic acids include formic acid, acetic acid, propionic acid, butanoic acid, pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, neononanoic acid, decanoic acid, neodecanoic acid, undecanoic acid, neoundecanoic acid, dodecanoic acid, neododecanoic acid, myristic acid, pentadecanoic acid, hexadecanoic acid, heptadecanoic acid, octadecanoic acid, benzoic acid, oxalic acid, malonic acid, succinic acid, glutaric acid, adipic acid, pimelic acid, suberic acid, azelaic acid, sebacic acid, glycolic acid, lactic acid, tartaric acid, citric acid, malic acid, salicylic acid and the like.

In one aspect of the present invention, the catalyst composition comprising at least one sterically hindered carboxylate salt in combination with a tertiary amine having an isocyanate reactive group has thermal stability up to about 150° C., wherein no or substantially no volatile amine compounds are emitted. Typical foam temperatures resulting from the exothermic reactions during the processing of PIR/PUR foam can be in the range of about 80° C. to about 150° C. In a further aspect, the catalyst system of the present invention has thermal stability up to about 175° C., about 200° C., about 220° C., about 240° C., or about 250° C.

The sterically hindered carboxylate salts in combination with a tertiary amine having an isocyanate reactive group composition of the present invention can be produced, for example, by directly combining or mixing a solution of the sterically hindered carboxylate salt with the tertiary amine having at least one isocyanate reactive group. The sterically hindered carboxylate salt can be produced, for example, by the reaction of an organic acid with an alkali hydroxide. In another aspect of the present invention, the sterically hindered carboxylate salt can be produced by the reaction of an organic acid with a tetraalkylammonium hydroxide, or a reaction of an organic acid with a tertiary amine followed by a reaction with an epoxy compound. The latter reaction with an epoxy can lead to a hydroxyalkyl quaternary compound (for example, 2-hydroxypropyltrimethyl-ammonium) which is unstable at elevated temperatures. However, such reaction products can be employed in the present invention. The wt % ratio of sterically hindered carboxylate salt (neat free of solvent) to at least one tertiary amine having at least one isocyanate reactive group (neat sterically hindered carboxylate salt free of solvent+ tertiary amine having at least one isocyanate reactive group=100%) will range from about 95% to about 5%, typically from about 80% to about 10% and more typically from about 70% to about 30%.

Although not a requirement of the present invention, the catalyst system or novel compositions of the present invention can further comprise other catalytic materials or carboxylate salts in any amount. These can include, but are not limited to, alkali metal α,β-unsaturated carboxylate salts, alkaline earth metal α,β-unsaturated carboxylate salts, quaternary ammonium α,β-unsaturated carboxylate salts, alkali metal carboxylate salts, alkaline earth metal carboxylate salts, quaternary ammonium carboxylate salts, or any combination thereof. Illustrative examples of α,β-unsaturated carboxylate salts include, but are not limited to, potassium acrylate, tetramethylammonium acrylate, tetraethylammonium acrylate, tetrapropylammonium acrylate, tetrabutylammonium acrylate, potassium methacrylate, tetramethylammonium methacrylate, tetraethylammonium methacrylate, tetrapropylammonium methacrylate, tetrabutylammonium methacrylate, mono-potassium fumarate, bis-potassium fumarate, mono-tetramethylammonium fumarate, bis-tetramethylammonium fumarate, potassium tetramethylammonium fumarate, mono-tetraethylammonium fumarate, bis-tetraethylammonium fumarate, potassium tetraethylammonium fumarate, mono-tetrapropylammonium fumarate, bis-tetrapropylammonium fumarate, potassium tetrapropylammonium fumarate, mono-tetrabutylammonium fumarate, bis-tetrabutylammonium fumarate, potassium tetrabutylammonium fumarate, mono-potassium maleate, bis-potassium maleate, mono-tetramethylammonium maleate, bis-tetramethylammonium maleate, potassium tetramethylammonium maleate, mono-tetraethylammonium maleate, bis-tetraethylammonium maleate, potassium tetraethylammonium maleate, mono-tetrapropylammonium maleate, bis-tetrapropylammonium maleate, potassium tetrapropylammonium maleate, mono-tetrabutylammonium maleate, bis-tetrabutylammonium maleate, potassium tetrabutylammonium maleate, trimethyl(2-hydroxyethyl)ammonium acrylate, triethyl(2-hydroxyethyl)ammonium acrylate, tripropyl(2-hydroxyethyl)ammonium acrylate, tributyl(2-hydroxyethyl)ammonium acrylate, dimethylbenzyl(2-hydroxypropyl)ammonium acrylate, dimethylbenzyl(2-hydroxyethyl)ammonium acrylate, trimethyl(2-hydroxyethyl)ammonium methacrylate, triethyl(2-hydroxyethyl)ammonium methacrylate, tripropyl(2-hydroxyethyl)ammonium methacrylate, tributyl(2-hydroxyethyl)ammonium methacrylate, dimethylbenzyl(2-hydroxypropyl)ammonium methacrylate, dimethylbenzyl(2-hydroxyethyl)ammonium methacrylate, bis-(trimethyl(2-hydroxyethyl)ammonium) maleate, bis-(triethyl(2-hydroxyethyl)ammonium) maleate, bis-(tripropyl(2-hydroxyethyl)ammonium) maleate, bis-(tributyl(2-hydroxyethyl)ammonium) maleate, bis-(dimethylbenzyl(2-hydroxypropyl)ammonium) maleate, bis-(dimethylbenzyl(2-hydroxyethyl)ammonium) maleate, bis-(trimethyl(2-hydroxyethyl)ammonium) fumarate, bis-(triethyl(2-hydroxyethyl)ammonium) fumarate, bis-(tripropyl(2-hydroxyethyl)ammonium) fumarate, bis-(tributyl(2-hydroxyethyl)ammonium) fumarate, bis-(dimethylbenzyl(2-hydroxypropyl)ammonium) fumarate, bis-(dimethylbenzyl(2-hydroxyethyl)ammonium) fumarate, and the like, or any combination thereof.

Illustrative examples of alkali metal, alkaline earth metal, and quaternary ammonium carboxylate salts include, but are not limited to, potassium formate, potassium acetate, potassium propionate, potassium butanoate, potassium pentanoate, potassium hexanoate, potassium heptanoate, potassium octoate, potassium 2-ethylhexanoate, potassium decanoate, potassium butyrate, potassium isobutyrate, potassium nonante, potassium stearate, sodium octoate, lithium stearate, sodium caprioate, lithium octoate, 2-hydroxypropyltrimethylammonium octoate solution, and the like, or any combination thereof.

The amount of the other catalytic materials and salts can range from about 0.01 pphp to about 20 pphp, about 0.1 pphp to about 15 pphp and in some cases about 0.5 pphp to about 10 pphp.

It is also within the scope of the catalyst composition of this invention to include mixtures or combinations of more that one sterically hindered carboxylate salt. Additionally, the catalyst system or the novel compositions of the present invention can also further comprise at least one urethane catalyst having no isocyanate reactive groups.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or foam formulations described herein. Combining additional catalyst components can be done by any method known to one of skill in the art. For example, in one aspect of the present invention, catalyst compositions can be prepared by combining or contacting the at least one sterically hindered carboxylate salt with at least one tertiary amine having at least one isocyanate reactive group and optionally with an alkali metal carboxylate salt. This typically occurs in solution form. In another aspect, the catalyst composition can be prepared by first mixing the respective carboxylic acids, followed by neutralization to form the corresponding salts followed by combining or contacting with a tertiary amine catalysts having at least one isocyanate reactive group.

While compositions and methods are described in terms of "comprising" various components or steps, the compositions and methods can also "consist essentially of" or "consist of" the various components or steps.

Sterically Hindered Carboxylate Salts

Catalyst compositions of the present invention comprise a) at least one sterically hindered carboxylate salt. The at least one sterically hindered carboxylate salt is particularly useful for producing PIR/PUR foams. Further, catalyst compositions within the scope of the present invention can comprise at least one sterically hindered carboxylate salt having the formula

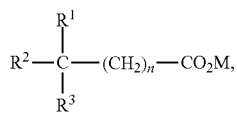

wherein:

$R^1$, $R^2$, and $R^3$ are selected independently from a $C_1$-$C_{18}$ alkyl, alkenyl, aryl, or aralkyl, any of which are substituted or unsubstituted;

n is an integer from 0 to 10, inclusive; and

M is an alkali metal ion or a quaternary ammonium ion, and;

b) at least one tertiary amine catalyst having at least one isocyanate reactive group selected from primary hydroxyl group, secondary hydroxyl group, primary amine, secondary amine, urea group and amide group.

Unless otherwise specified, alkyl and alkenyl groups described herein are intended to include all structural isomers, linear or branched, of a given structure; for example, all enantiomers and all diasteriomers are included within this definition. As an example, unless otherwise specified, the term propyl is meant to include n-propyl and iso-propyl, while the term butyl is meant to include n-butyl, iso-butyl, t-butyl, sec-butyl, and so forth. Similarly, substituted alkyl, alkenyl, aryl, and aralkyl groups described herein are intended to include substituted analogs of a given structure. For example, the substituents on alkyl, alkenyl, aryl, and aralkyl groups can include, but are not limited to, halides; hydroxyl groups; amino groups; alkoxy, alkylamino, or dialkylamino groups having up to 10 carbon atoms; or combinations thereof.

Non-limiting examples of alkyl groups which can be present in the at least one sterically hindered carboxylate salt include, but are not limited to, methyl, ethyl, propyl, butyl, pentyl, hexyl, heptyl, octyl, nonyl, or decyl, and the like. Examples of alkenyl groups within the scope of the present invention include, but are not limited to, ethenyl, propenyl, butenyl, pentenyl, hexenyl, heptenyl, octenyl, nonenyl, decenyl, and the like. Aryl and aralkyl (aralkyl is defined as an aryl-substituted alkyl or arylalkyl) groups include phenyl, alkyl-substituted phenyl, naphthyl, alkyl-substituted naphthyl, and the like. For example, non-limiting examples of aryl and aralkyl groups useful in the present invention include, but are not limited to, phenyl, tolyl, benzyl, dimethylphenyl, trimethylphenyl, phenylethyl, phenylpropyl, phenylbutyl, propyl-2-phenylethyl, and the like.

In one aspect of the present invention, $R^1$, $R^2$, and $R^3$ are selected independently from methyl, ethyl, propyl, butyl, pentyl, hexyl, heptyl, octyl, phenyl, tolyl, and benzyl. In another aspect, $R^1$, $R^2$, and $R^3$ are selected independently from methyl, ethyl, propyl, and butyl. In accordance with a further aspect of the present invention, $R^1$, $R^2$, and $R^3$ of the sterically hindered structure are not hydrogen atoms.

In another aspect, M is an ion of lithium, potassium, sodium, or rubidium. In yet another aspect, M is a potassium ion. Quaternary ammonium ions useful in the present invention include, but are not limited to, tetramethylammonium, tetraethylammonium, tetrapropylammonium, tetrabutylammonium, dimethyldiallylammonium, trimethyl-(2-hydroxypropyl)ammonium, triethyl(2-hydroxypropyl)ammonium, tripropyl(2-hydroxy-propyl)ammonium, tributyl(2-hydroxypropyl)ammonium, trimethyl(2-hydroxyethyl)-ammonium, triethyl(2-hydroxyethyl)ammonium, tripropyl(2-hydroxyethyl)ammonium, tributyl(2-hydroxyethyl)ammonium, dimethylbenzyl(2-hydroxypropyl)ammonium, dimethylbenzyl(2-hydroxyethyl)ammonium, and the like, or any combination thereof. In a further aspect of the present invention, M is a tetramethylammonium ion or a dimethyldiallylammoniumion.

The integer n in the above formula can range from 0 to 10, inclusive, in one aspect of the present invention. In another aspect, n can range from 0 to 5, inclusive. In still another aspect, n equals zero. As an example, when $R^1$, $R^2$, and $R^3$ are each a methyl group, M is a potassium ion, and n equals zero, the sterically hindered carboxylate salt is potassium pivalate.

In another aspect of the present invention, the at least one sterically hindered carboxylate salt used in combination with at least one tertiary amine having at least one isocyanate reactive group is an alkali metal carboxylate salt or a quaternary ammonium carboxylate salt, or a combination thereof. In yet another aspect, the sterically hindered carboxylate salts and acids within the scope of this invention comprise at least one quaternary carbon moiety. That is, as a minimum, one carbon atom within the carboxylate salt or carboxylic acid structures and materials described herein is a quaternary carbon. As used herein, a quaternary carbon is defined as a carbon that is bonded to four other carbon atoms. This quaternary carbon moiety can be further illustrated, for example, by the carboxylate salt and acid species that follow.

Suitable sterically hindered carboxylate salts of the present invention include, but are not limited to, potassium pivalate, tetramethylammonium pivalate, 2-hydroxyl-propyltrimethylammonium pivalate, 2-hydroxylpropyltriethylammonium pivalate, tetraethylammonium pivalate, tetrapropylammonium pivalate, tetrabutylammonium pivalate, dimethyldiallylammonium pivalate, potassium triethylacetate, tetramethyl-ammonium triethylacetate, 2-hydroxylpropyltrimethylammonium triethylacetate, 2-hydroxylpropyltriethylammonium triethylacetate, tetraethylammonium triethylacetate, tetrapropylammonium triethylacetate, tetrabutylammonium triethylacetate, potassium neoheptanoate, tetramethylammonium neoheptanoate, 2-hydroxylpropyltrimethyl-ammonium neoheptanoate, 2-hydroxylpropyltriethylammonium neoheptanoate, tetraethylammonium neoheptanoate, tetrapropylammonium neoheptanoate, tetrabutyl-ammonium neoheptanoate, potassium neooctanoate, tetramethylammonium neooctanoate, 2-hydroxylpropyltrimethylammonium neooctanoate, 2-hydroxyl-propyltriethylammonium neooctanoate, tetraethylammonium neooctanoate, tetrapropyl-ammonium neooctanoate, tetrabutylammonium neooctanoate, potassium neodecanoate, tetramethylammonium neodecanoate, 2-hydroxylpropyltrimethylammonium neodecanoate, 2-hydroxylpropyltriethylammonium neodecanoate, tetraethylammonium neodecanoate, tetrapropylammonium neodecanoate, tetrabutylammonium neodecanoate, and the like, or any combination thereof.

In another aspect of the present invention, the at least one sterically hindered carboxylate salt used in combination with at least one tertiary amine having at least one isocyanate reactive group is a tetraalkylammonium carboxylate salt. In yet another aspect, the at least one sterically hindered carboxylate is tetramethylammonium pivalate, dimethyldiallylammonium pivalate, potassium pivalate, potassium neoheptanoate, potassium neodecanoate, or a combination thereof. In still another aspect, the at least one sterically hindered carboxylate salt used in combination with at least one tertiary amine having at least one isocyanate reactive group is potassium pivalate.

In a further aspect, the at least one sterically hindered carboxylate salt used in combination with at least one tertiary amine having at least one isocyanate reactive group is a salt of a carboxylic acid, for example, an alkali metal salt or quaternary ammonium salt of a sterically hindered carboxylic acid. Suitable carboxylic acids within the scope of the present invention include, but are not limited to, pivalic, triethylacetic, neohexanoic, neoheptanoic, neooctanoic, neodecanoic, neoundecanoic, neododecanoic, and the like, mixtures thereof, or any combination thereof.

The sterically hindered carboxylate salt is used in combination with at least one tertiary amine having at least one isocyanate reactive group comprising a primary hydroxyl group, a secondary hydroxyl group, a primary amine group, a secondary amine group, a urea group or an amide group. Example of tertiary amine catalyst having an isocyanate group include, but are not limited to N, N-bis(3-dimethylaminopropyl)-N-isopropanolamine, N, N-dimethylaminoethyl-N'-methyl ethanolamine, N, N, N'-trimethylaminopropylethanolamine, N, N-dimethylethanolamine, N, N-diethylethanolamine N, N-dimethyl-N', N'-2-hydroxy (propyl)-1, 3-propylenediamine,dimethylaminopropylamine, (N, N-dimethylaminoethoxy) ethanol, methyl-hydroxyethyl-piperazine, bis(N, N-dimethyl-3-aminopropyl) amine, N, N-dimethylaminopropyl urea, diethylaminopropyl urea, N, N'-bis(3-dimethylaminopropyl)urea, N, N'-bis(3-diethylaminopropyl)urea, bis(dimethylamino)-2-propanol, 6-dimethylamio-1-hexanol, N-(3-aminopropyl) imidazole), N-(2-hydroxypropyl) imidazole, and N-(2-hydroxyethyl) imidazole, 2-[N-(dimethylaminoethoxyethyl)-N-methylamino] ethanol, N, N-dimethylaminoethyl-N'-methyl-N'-ethanol, dimethylaminoethoxyethanol, N, N, N'-trimethyl-N'-3-aminopropyl-bis(aminoethyl) ether, or a combination thereof.

Polyisocyanates

Polyisocyanates that are useful in the PIR/PUR foam formation process include, but are not limited to, hexamethylene diisocyanate, isophorone diisocyanate, phenylene diisocyante, toluene diisocyanate (TDI), diphenyl methane diisocyanate isomers (MDI), hydrated MDI and 1,5-naphthalene diisocyanate. For example, 2,4-TDI, 2,6-TDI, and mixtures thereof, can be readily employed in the present invention. Other suitable mixtures of diisocyanates include, but are not limited to, those known in the art as crude MDI, or PAPI, which contain 4,4'-diphenylmethane diisocyanate along with other isomeric and analogous higher polyisocyanates. In another aspect of this invention, prepolymers of polyisocyanates comprising a partially pre-reacted mixture of polyisocyanates and polyether or polyester polyol are suitable. In still another aspect, the polyisocyanate comprises MDI, or consists essentially of MDI or mixtures of MDI's.

The catalyst system, compositions, and methods of producing PIR/PUR foam of the present invention can be used to manufacture many types of foam. This catalyst system is useful, for example, in the formation of foam products for rigid and flame retardant applications, which usually require a high Isocyanate Index. As defined previously, Isocyanate Index is the actual amount of polyisocyanate used divided by the theoretically required stoichiometric amount of polyisocyanate required to react with all the active hydrogen in the reaction mixture, multiplied by 100. For purposes of the present invention, Isocyanate Index is represented by the equation: Isocyanate Index=(Eq NCO/Eq of active hydrogen)×100, wherein Eq NCO is the number of NCO functional groups in the polyisocyanate, and Eq of active hydrogen is the number of equivalent active hydrogen atoms.

Foam products which are produced with an Isocyanate Index from about 80 to about 800 are within the scope of this invention. In accordance with other aspects of the present invention, the Isocyanate Index ranges from about 100 to about 700, from about 150 to about 650, from about 200 to about 600, or from about 250 to about 500.

Polyols

Active hydrogen-containing compounds for use with the foregoing polyisocyanates in forming the polyisocyanurate/polyurethane foams of this invention can be any of those organic compounds having at least two hydroxyl groups such as, for example, polyols. Polyols that are typically used in PIR/PUR foam formation processes include polyalkylene ether and polyester polyols. The polyalkylene ether polyol includes the poly(alkyleneoxide) polymers such as poly(ethyleneoxide) and poly(propyleneoxide) polymers and copolymers with terminal hydroxyl groups derived from polyhydric compounds, including diols and triols. These include, but are not limited to, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, and sugars such as sucrose and like low molecular weight polyols.

Amine polyether polyols can be used in the present invention. These can be prepared when an amine such as, for example, ethylenediamine, diethylenetriamine, tolylenediamine, diphenylmethanediamine, or triethanolamine is reacted with ethylene oxide or propylene oxide.

In another aspect of the present invention, a single high molecular weight polyether polyol, or a mixture of high molecular weight polyether polyols, such as mixtures of different multifunctional materials and/or different molecular weight or different chemical composition materials can be used.

In yet another aspect of the present invention, polyester polyols can be used, including those produced when a dicarboxylic acid is reacted with an excess of a diol. Non-limiting examples include adipic acid or phathalic acid or phthalic anhydride reacting with ethylene glycol or butanediol. Polyols useful in the present invention can be produced by reacting a lactone with an excess of a diol, for example, caprolactone reacted with propylene glycol. In a further aspect, active hydrogen-containing compounds such as polyester polyols and polyether polyols, and combinations thereof, are useful in the present invention.

The polyol can have an OH number of about 5 to about 600, about 100 to about 600 and in some cases about 50 to about 100. and a functionality of about 2 to about 8, about 3 to about 6 and in some cases about 4 to about 6.

The amount of polyol can range from about 0 pphp to about 100 pphp about 10 pphp to about 90 pphp and in some cases about 20 pphp to about 80 pphp.

Blowing Agents

In accordance with the compositions, foam formulations, and methods of producing PIR/PUR foam within the scope of the present invention, suitable blowing agents that can be used alone or in combination include, but are not limited to, water, methylene chloride, acetone, hydrofluorocarbons (HFCs), hydrochlorocarbons (HCCs), hydrofluoroolefins (HFOs), chlorofluoroolefins (CFOs), hydrochloroolefins (HCOs), hydrofluorochloroolefins (HFCOs), hydrochlorofluorocarbons (HCFCs), formates, and hydrocabons and hydrocarbons. Examples of HFCs include, but are not limited to, HFC-245fa, HFC-134a, and HFC-365; illustrative examples of HCFCs include, but are not limited to, HCFC-141b, HCFC-22, and HCFC-123. Exemplary hydrocarbons include, but are not limited to, n-pentane, iso-pentane, cyclopentane, and the like, or any combination thereof. In one aspect of the present invention, the blowing agent or mixture of blowing agents comprises at least one hydrocarbon. In another aspect, the blowing agent comprises n-pentane. Yet, in another aspect of the present invention, the blowing agent consists essentially of n-pentane or mixtures of n-pentane with one or more blowing agents. Examples of hydrohaloolefin blowing agents are HFO-1234ze (trans-1,3,3,3-Tetrafluoroprop-1-ene), HFO-1234yf (2,3,3,3-Tetrafluoropropene) and HFCO-1233zd (1-Propene,1-chloro-3,3,3-trifluoro), among other HFOs.

Due to the discovery that chlorofluorocarbons (CFCs) can deplete ozone in the stratosphere, this class of blowing agents is not desirable for use in the present invention. A chlorofluorocarbon (CFC) is an alkane in which all hydrogen atoms are substituted with chlorine and fluorine atoms. Examples of CFCs include trichlorofluoromethane and dichlorodifluoromethane. Thus, compositions in accordance with the present invention comprise only non-CFC blowing agents.

The amount of blowing agent used can vary based on, for example, the intended use and application of the foam product and the desired foam stiffness and density. In the compositions, foam formulations and methods for preparing a polyisocyanurate/polyurethane foam of the present invention, the blowing agent is present in amounts from about 10 to about 80 parts by weight per hundred weight parts of the at least one active hydrogen-containing compound. In another aspect, the blowing agent is present in amounts from about 12 to about 60, from about 14 to about 50, or from about 16 to about 40, parts by weight per hundred weight parts of the at least one active hydrogen-containing compound. If the at least one active hydrogen-containing compound is an at least one polyol, the blowing agent is present in amounts from about 10 to about 80 parts by weight per hundred weight parts polyol (pphp), from about 12 to about 60 pphp, from about 14 to about 50 pphp, or from about 16 to about 40 pphp.

If water is present in the formulation, for use as a blowing agent or otherwise, water is present in amounts up to about 15 parts by weight per hundred weight parts of the at least one active hydrogen-containing compound. Likewise, if the at least one active hydrogen-containing compound is an at least one polyol, water can range from 0 to about 15 pphp. In another aspect, water can range from 0 to about 10 pphp, from 0 to about 8 pphp, from 0 to about 6 pphp, or from 0 to about 4 pphp.

Urethane Catalyst

Conventional urethane catalysts having no isocyanate reactive group can be employed to accelerate the reaction to form polyurethanes, and can be used as a further component of the catalyst systems and compositions of the present invention to produce polyisocyanurate/polyurethane foam. Urethane catalysts suitable for use herein include, but are not limited to, metal salt catalysts, such as organotins, and amine compounds, such as triethylenediamine (TEDA), N-methylimidazole, 1,2-dimethyl-imidazole, N-methylmorpholine (commercially available as the DABCO® NMM catalyst), N-ethylmorpholine (commercially available as the DABCO® NEM catalyst), triethylamine (commercially available as the DABCO® TETN catalyst), N,N'-dimethylpiperazine, 1,3,5-tris(dimethylaminopropyl)hexahydrotriazine (commercially available as the Polycat® 41 catalyst), 2,4,6-tris(dimethylaminomethyl)phenol (commercially available as the DABCO TMR® 30 catalyst), N-methyldicyclohexylamine (commercially available as the Polycat® 12 catalyst), pentamethyldipropylene triamine (commercially available as the Polycat® 77 catalyst), N-methyl-N'-(2-dimethylamino)-ethyl-piperazine, tributylamine, pentamethyl-diethylenetriamine (commercially available as the Polycat® 5 catalyst), hexamethyl-triethylenetetramine, heptamethyltetraethylenepentamine, dimethylaminocyclohexyl-amine (commercially available as the Polycat® 8 catalyst), pentamethyldipropylene-triamine, triethanolamine, dimethylethanolamine, bis(dimethylaminoethyl) ether (commercially available as the DABCO® BL19 catalyst), tris(3-dimethylamino)-propylamine (commercially available as the Polycat® 9 catalyst), 1,8-diazabicyclo [5.4.0] undecene (commercially available as the DABCO® DBU catalyst) or its acid blocked derivatives, and the like, as well as any mixture thereof. Particularly useful as a urethane catalyst for foam applications related to the present invention is the Polycat® 5 catalyst, which is known chemically as pentamethyldiethylenetriamine.

For preparing a polyisocyanurate/polyurethane foam of the present invention, the urethane catalyst can be present in the formulation from 0 to about 10 pphp, from 0 to about 8 pphp, from 0 to about 6 pphp, from 0 to about 4 pphp, from 0 to about 2 pphp, or from 0 to about 1 pphp. In another aspect, the urethane catalyst is present from 0 to about 0.8 pphp, from 0 to about 0.6 pphp, from 0 to about 0.4 pphp, or from 0 to about 0.2 pphp.

Miscellaneous Additives

Depending upon on the requirements during foam manufacturing or for the end-use application of the foam product, various additives can be employed in the PIR/PUR foam formulation to tailor specific properties. These include, but are not limited to, cell stabilizers, flame retardants, chain extenders, epoxy resins, acrylic resins, fillers, pigments, or any combination thereof. It is understood that other mixtures or materials that are known in the art can be included in the foam formulations and are within the scope of the present invention.

Cell stabilizers include surfactants such as organopolysiloxanes. Silicon surfactants can be present in the foam formulation in amounts from about 0.5 to about 10 pphp, about 0.6 to about 9 pphp, about 0.7 to about 8 pphp, about 0.8 to about 7 pphp, about 0.9 to about 6 pphp, about 1 to about 5 pphp, or about 1.1 to about 4 pphp. Useful flame retardants include halogenated organophosphorous compounds and non-halogenated compounds. A non-limiting example of a halogenated flame retardant is trichloropropylphosphate (TCPP). For example, triethylphosphate ester (TEP) and DMMP are non-halogenated flame retardants. Depending on the end-use foam application, flame retardants can be present in the foam formulation in amounts from 0 to about 50 pphp, from 0 to about 40 pphp, from 0 to about 30 pphp, or from 0 to about 20 pphp. In another aspect, the flame retardant is present from 0 to about 15 pphp, 0 to about 10 pphp, 0 to about 7 pphp, or 0 to about 5 pphp. Chain extenders such as ethylene glycol and butane diol can also be employed in the present invention. Ethylene glycol, for instance, can also be present in the formulation as a diluent or solvent for the carboxylate salt catalysts of the present invention.

Polyisocyanurate/Polyurethane Foam Formulation and Process

One aspect of the present invention provides for a composition comprising the contact product of at least one active hydrogen-containing compound, at least one blowing agent, and a catalyst composition comprising at least one sterically hindered carboxylate salt used in combination with at least one tertiary amine having at least one isocyanate reactive group. Another aspect provides a composition comprising the contact product of at least one polyisocyanate, at least one blowing agent, and a catalyst composition comprising at least one sterically hindered carboxylate salt used in combination with at least one tertiary amine having at least one isocyanate reactive group. In both of these two compositions, the composition can further comprise at least one urethane catalyst having no isocyanate reactive group. Likewise, the compositions can further comprise at least one additive selected from at least one cell stabilizer, at least one flame retardant, at least one chain extender, at least one epoxy resin, at least one acrylic resin, at least one filler, at least one pigment, or any combination thereof.

The present invention provides a method for preparing a polyisocyanurate/polyurethane (PIR/PUR) foam which comprises contacting at least one polyisocyanate with at least one active hydrogen-containing compound, in the presence of at least one blowing agent and an effective amount of a catalyst composition comprising at least one sterically hindered carboxylate salt used in combination with at least one tertiary amine having at least one isocyanate reactive group. In accordance with the method of the present invention, PIR/PUR foams can be produced having a density from about 20 Kg/m$^3$ to about 250 Kg/m$^3$ (about 1.25 lb/ft$^3$ to about 15.5 lb/ft$^3$), or from about 24 Kg/m$^3$ to about 60 Kg/m$^3$ (about 1.5 lb/ft$^3$ to about 3.75 lb/ft$^3$).

The instant invention can be used in a wide range of methods for making rigid closed-cell foams. Examples of suitable methods comprise molding, spraying, among other rigid foam production methods. In one aspect the inventive method relates to a method for making a laminated foam.

In another aspect, the method of the present invention offers a substantially consistent foam height rise versus time—even at a high Isocyanate Index—that is highly desired for continuous foam manufacturing operations. The method for preparing PIR/PUR foams also can provide equivalent or faster surface cure when compared to other commercially available catalyst systems, such that the PIR/PUR foam has enhanced surface adherence, useful for the production are articles such as laminated foam panels.

Optionally, in yet another aspect, the method of the present invention can produce PIR/PUR foams with no or substantially no undesirable amine odor. Dependent upon the selection of the specific at least one sterically hindered carboxylate salt, this method can provide thermal stability at the temperatures which PIR/PUR foams normally encounter during manufacturing, even those foams formulated with a high Isocyanate Index. In a further aspect, the method for preparing PIR/PUR foam has thermally stability up to about 150° C., or about 175° C., or about 200° C., or about 220° C., or about 240° C., or about 250° C. In a still further aspect, the method of the present invention produces PIR/PUR foam that is substantially free of volatile amines and/or amine odors.

The catalyst composition comprising at least one sterically hindered carboxylate salt used in combination with at least one tertiary amine having at least one isocyanate reactive group should be present in the foam formulation in a catalytically effective amount. In PIR/PUR foam formulations of the present invention, the catalyst composition is present in amounts from about 0.05 to about 10 parts by weight per hundred weight parts of the at least one active hydrogen-containing compound, excluding the weight contribution of the catalyst system diluent. In another aspect, the catalyst composition is present in amounts from about 0.4 to about 9 parts, or from about 0.8 to about 8 parts, by weight per hundred weight parts of the at least one active hydrogen-containing compound. If the at least one active hydrogen-containing compound is an at least one polyol, the catalyst composition is present in amounts from about 0.05 to about 10 parts by weight per hundred weight parts polyol (pphp). In another aspect, the catalyst composition is present in amounts from about 0.2 to about 9.5 pphp, about 0.4 to about 9 pphp, about 0.6 to about 8.5 pphp, or about 0.8 to about 8 pphp.

In accordance with one aspect of the method of the present invention, the components of the foam formulation are contacted substantially contemporaneously. For example, at least one polyisocyanate, at least one active hydrogen-containing compound, at least one blowing agent and an effective amount of a catalyst composition comprising at least one sterically hindered carboxylate salt used in combination with at least one tertiary amine having at least one isocyanate reactive group, are contacted together. Given the number of components involved in PIR/PUR formulations, there are many different orders of combining the components, and one of skill in the art would realize that varying the order of addition of the components falls within the scope of the present invention. As well, for each of the different orders of combining the aforementioned components of the foam formulation, the foam formulation of the present invention can further comprise at least one urethane catalyst. In addition, the method of producing PIR/PUR foams can further comprise the presence of at least one additive selected from at least one cell stabilizer, at least one flame retardant, at least one chain extender, at least one epoxy resin, at least one acrylic resin, at least one filler, at least one pigment, or any combination thereof. In one aspect of the present invention, all of the components, including optional components, are contacted substantially contemporaneously.

In another aspect of the present invention, a premix of ingredients other than the at least one polyisocyanate are contacted first, followed by the addition of the at least one polyisocyanate. For example, the at least one active hydrogen-containing compound, the at least one blowing agent, and the catalyst composition of the present invention are contacted initially to form a premix. The premix is then contacted with the at least one polyisocyanate to produce PIR/PUR foams in accordance with the method of the present invention. In a further aspect of the present invention, the same method can be employed, wherein the premix further comprises at least one urethane catalyst. Likewise, the premix can further comprise at least one additive selected from at least one cell stabilizer, at least one flame retardant, at least one chain extender, at least one epoxy resin, at least one acrylic resin, at least one filler, at least one pigment, or any combination thereof.

One aspect of the present invention provides a method for preparing a polyisocyanurate/polyurethane foam comprising (a) forming a premix comprising:
i) at least one polyol;
ii) about 10 to about 80 parts by weight per hundred weight parts of the polyol (pphp) blowing agent;
iii) about 0.5 to about 10 pphp silicon surfactant;
iv) zero to about 10 pphp water;
v) zero to about 50 pphp flame retardant;
vi) zero to about 10 pphp urethane catalyst; and
vii) about 0.05 to about 10 pphp of a catalyst composition comprising at least one sterically hindered carboxylate salt used in combination with at least one tertiary amine having at least one isocyanate reactive group; and
(b) contacting the premix with at least one polyisocyanate at an Isocyanate Index from about 80 to about 800.

As indicated previously, the blowing agent is not a chlorofluorocarbon (CFC).

EXAMPLES

These Examples are provided to demonstrate certain aspects of the invention and shall not limit the scope of the claims appended hereto.

The foams were produced by adding catalysts into a premix of a polyol (Polyester polyol XCPA®-320 supplied by Xuchuan Chemicals), flame retardant (TCPP; tris(1-chloro-2-propyl) phosphate), surfactant (DABCO®SI3102 silicone surfactant supplied by Air Products & Chemicals, Inc.), blowing agent (Genetron®-141b; 1,1-dichloro-1-fluoroethane) and water mixture in a 500 mL plastic cup. This composition was mixed for about 5 seconds (s) at about 5,000 RPM using an overhead stirrer fitted with a 6.2-cm diameter stirring paddle. Isocyanate was then added to achieve the desired Isocyanate Index which was 450. Then the mixture was mixed well for about 5 seconds (s) at about 5,000 RPM using the same stirrer. The 500 mL plastic round cup was placed and fit into 2.6 liter round paper cup in a manner that the top of the 500 ml container almost coincide with the bottom of the 2.6 liter paper cup. This allows the foam to expand inside the 2.6 liter round cup and move upwards since the walls of the 2.6 liter container restricts lateral expansion of the foaming mass. At end of the foaming process, the foam height was about 10 cm higher and above the 2.6 liter paper cup edge. String gel time (defined as the time in seconds at which the polymerizing mass is able to form polymer strings when touched with a wooden tongue suppressor) and tack free time (TFT; defined as the time in seconds for the surface to attain a sufficient robust state or cure that no damage or stickiness occurs on the surface when touched with a wooden tongue suppressor) were measured using a chronometer and determined manually using a tongue suppressor. Start time was defined as the time in seconds when the foaming mass begins expansion.

TABLE I

Formulation
Formulation of Foams (catalyst varied)

| COMPONENTS | PARTS (weight) | PARTS (weight) | NOTES |
| --- | --- | --- | --- |
| XCPA ®-320 | 100 | 100 | Polyester polyol with 320 OH value supplied by Xuchuan Chemicals |
| Dabco ®SI3102 | 2.5 | 2.5 | Silicone surfactant supplied by Air Products & Chemicals |
| TCPP | 25 | 25 | tris(1-chloro-2-propyl) phosphate Flame retardant |
| H2O | 1.3 | 1.3 | Water |
| Genetron ®141b | 30 | 30 | 1,1-dichloro-1-fluoroethane blowing agent |
| Polycat ®-5 |  | 0.3 | Pentamethyldiethylenetriamine supplied by Air Products & Chemicals |
| Polycat ®-8 |  | 0.4 | Dimethylcyclohexylamine supplied by Air Products & Chemicals |
| Dabco ®-T | 1.2 |  | Reactive catalyst from Air Products |
| Trimer catalyst | Varied | Varied |  |
| Isocyanate Index | 450 | 450 | 44v20L, PMDI from Bayer |

Various types and quantities of catalysts were used to produce PIR/PUR foams of the present invention. In these examples, unless otherwise specified, the pphp values listed exclude the additional weight of the diluent. Table I lists the components of the foam formulation and their respective pphp that are used in these examples.

Example 1

Surface Curing

Comparison Between Sterically Hindered Salts and Non-Sterically Hindered Salts in the Presence of Isocyanate Reactive Tertiary Amines and in the Presence of Conventional Amines with No Isocyanate Reactive Groups Sterically hindered carboxylate salt Cat-1 was prepared by dissolving potassium hydroxide in ethylene glycol, followed by neutralization by the addition of an equivalent amount of pivalic acid. The resulting approximate 50% solution of potassium pivalate in ethylene glycol constitute Cat-1.

Sterically hindered carboxylate salt Cat-2 was prepared by mixing an approximate 25% solution of tetramethylammonium hydroxide in methanol with ethylene glycol, followed by neutralization by the addition of an equivalent amount of pivalic acid.

After neutralization, the methanol and water were removed by vacuum distillation. The resulting approximate 50% solution of tetramethyl ammonium pivalate in ethylene glycol constitute sterically hindered Cat-2.

Free rise cup foam were prepared according to the method described above. Once tack free time (TFT) point is reached, the hardness on the surface of the foam is measured using a hardness durometer (purchased from Kobunshi Keiki Co. Ltd and model Asker Durometer Type C). Test position was near the top area of the foam. Foam surface hardness was measured and recorded every 30 seconds until the surface hardness values remained constant. Asker Durometer Type C provides hardness values according to a scale from 0 to 100 with 100 being maximum hardness and the method conforms with JIS Standard JIS K-6235 (ISO 7619).

TABLE II

Surface Curing: Sterically Hindered Salts and Conventional Salt
Surface hardness (Asker C) at different time point

| | Time (s) after mixing, With Dabco ®-T | | | |
|---|---|---|---|---|
| | 90 | 120 | 150 | 180 |
| 1.50 pphp TMAP[1] | 45 | 60 | 74 | 78 |
| 2.38 pphp KO[3] | 50 | 53 | 60 | 65 |
| 1.30 pphp KP[2] | 40 | 45 | 58 | 70 |
| 1.37 pphp KAc | 50 | 62 | 75 | 75 |

TABLE III

Surface Curing: Sterically Hindered Salts Combined with Amines
Surface hardness (Asker C) at different time point

| | Time (s) after mixing, With Dabco ®-T[4] | | | | Time (s) after mixing with Polycat ®-5[5] and Polycat ®-8[6] | | | |
|---|---|---|---|---|---|---|---|---|
| | 90 | 120 | 150 | 180 | 90 | 120 | 150 | 180 |
| 1.50 pphp TMAP[1] | 70 | 74 | 80 | 86 | 45 | 60 | 74 | 78 |
| 2.38 pphp KO[3] | 30 | 70 | 74 | 76 | 50 | 54 | 60 | 65 |
| 1.30 pphp KP[2] | 46 | 68 | 74 | 74 | 40 | 45 | 58 | 70 |
| 1.37 pphp KAc[7] | 54 | 66 | 68 | 75 | 50 | 62 | 75 | 75 |

[1]TMAP = Tetramethylammonium pivalate neat salt (excluding solvent) dispensed in the formulation as liquid Cat-2;
[2]KP = Potassium pivalate neat salt (excluding solvent) dispensed in the formulation as liquid Cat-1;
[3]KO = Potassium octoate (potassium 2-ethylhexanoate) neat salt (excluding solvent) dispensed in the formulation as liquid commercially available Dabco ®K15 which is a 70% solution of potassium octoate in diethylene glycol;
[4]Dabco ®-T = N,N-dimethylaminoethyl-N'-methyl-N'-ethanol;
[5]Polycat ®-5 = Pentamethyldiethylenetriamine;
[6]Polycat ®-8 = Dimethylaminocyclohexane;
[7]KAc = Potassium acetate neat salt (excluding solvent) dispensed in the formulation as a 38% solution of potassium acetate in ethylene glycol Comparison between Table II and Table III illustrates that a combination of a sterically hindered (TMAP and KP) salt with a tertiary amine having a primary hydroxyl group (Dabco®-T; N, N-dimethylaminoethyl-N'-methyl-N'-ethanol) provides an effective surface cure. Traditional non-sterically hindered carboxylate salts (KO) in combination with any tertiary amine having or not isocyanate reactive group provides an inferior surface cure. Similarly, sterically hindered salts with tertiary amine salts having no-isocyanate reactive groups (Polycat®-5 and Polycat®-8) provide an inferior surface cure than the catalyst of the invention.

Example 2

Core Curing

Comparison Between Sterically Hindered Salts and Non-Sterically Hindered Salts in the Presence of Isocyanate Reactive Tertiary Amines and in the Presence of Conventional Amines with No Isocyanate Reactive Groups Sterically hindered carboxylate salt of inventive example 1 were used to prepare free rise foam as described above. The top of the free rise foam specimen was cut along the paper cup edge 3.0 minutes after mixing all the components shown in Table I. On the cross section subjacent to the crust of the foam, we drew a circle with 10 cm diameter in the middle. Along the circle, Instron instrument was used to compress the foam specimens by a 6.5-cm diameter ball. The compression started 4 min after mixing of the components in Table I was completed. Compression displacement was set as 10 mm indentation. Five compression/indentations were carried out with an interval of 1.0 min between each test. The compressive strength was recorded in Newtons (N) by Instron Instrument model number 3365 purchased from Instron Corporation.

TABLE IV

Core Curing: Sterically Hindered Salts and Conventional Salt
Core Compressive strength at different time point

| | Time (s) after mixing, With Dabco ®-T[4] | | | | |
|---|---|---|---|---|---|
| Catalyst | 4 | 5 | 6 | 7 | 8 |
| 1.50 pphp TMAP[1] | 280 | 330 | 400 | 450 | 480 |
| 2.38 pphp KO[3] | 350 | 370 | 400 | 440 | 450 |
| 1.30 pphp KP[2] | 240 | 280 | 350 | 390 | 410 |
| 1.37 pphp KAc[7] | 290 | 340 | 360 | 400 | 414 |

TABLE V

Core Curing: Sterically Hindered Salts Combined with Amines
Core Compressive strength at different time point

|  | Time (s) after mixing, With Dabco ®-T[4] | | | | | Time (s) after mixing with Polycat ®-5[5] and Polycat ®-8[6] | | | | |
|---|---|---|---|---|---|---|---|---|---|---|
|  | 4 | 5 | 6 | 7 | 8 | 4 | 5 | 6 | 7 | 8 |
| 1.50 pphp TMAP[1] | 360 | 421 | 466 | 485 | 513 | 279 | 333 | 402 | 443 | 479 |
| 2.38 pphp KO[3] | 358 | 409 | 456 | 469 | 488 | 340 | 365 | 396 | 437 | 458 |
| 1.30 pphp KP[2] | 399 | 448 | 495 | 522 | 533 | 235 | 279 | 350 | 386 | 411 |
| 1.37 pphp KAc[7] | 345 | 373 | 395 | 406 | 414 | 295 | 321 | 356 | 392 | 418 |

[1]TMAP = Tetramethylammonium pivalate neat salt (excluding solvent) dispensed in the formulation as liquid Cat-2;
[2]KP = Potassium pivalate neat salt (excluding solvent) dispensed in the formulation as liquid Cat-1;
[3]KO = Potassium octoate (potassium 2-ethylhexanoate) neat salt (excluding solvent) dispensed in the formulation as liquid commercially available Dabco ®K15 which is a 70% solution of potassium octoate in diethylene glycol;
[4]Dabco ®-T = N,N-dimethylaminoethyl-N'-methyl-N'-ethanol;
[5]Polycat ®-5 = Pentamethyldiethylenetriamine;
[6]Polycat ®-8 = Dimethylaminocyclohexane;
[7]KAc = Potassium acetate neat salt (excluding solvent) dispensed in the formulation as a 38% solution of potassium acetate in ethylene glycol Comparison between Table IV and Table V illustrates that a combination of a sterically hindered salt (TMAP and KP) with a tertiary amine having a primary hydroxyl group (Dabco®-T; N, N-dimethylaminoethyl-N'-methyl-N'-ethanol) provides an effective core curing. Traditional non-sterically hindered carboxylate salts (KO) in combination with any tertiary amine (having or not isocyanate reactive group) provides an inferior surface cure. Similarly, sterically hindered salts with tertiary amine salts having no-isocyanate reactive groups (Polycat®-5 and Polycat®-8) provide an inferior surface cure than the catalyst of the invention.

Example 3

Surface and Core Curing with Various Catalysts Containing a Mixture of Sterically Hindered Salt and Various Tertiary Amine Catalysts Having Isocyanate Reactive Catalysts Foam were prepared as described above using the formulation shown in Table VI.

TABLE VI

Formulation
Formulation of Foams (catalyst varied)

| COMPONENTS | PARTS (weight) | NOTES |
|---|---|---|
| XCPA ®-320 | 100 | Polyester polyol with 320 OH value supplied by Xuchuan Chemicals |
| Dabco ®SI3102 | 2.5 | Silicone surfactant supplied by Air Products & Chemicals |
| TCPP | 25 | tris(1-chloro-2-propyl) phosphate Flame retardant |
| H2O | 1.3 | Water |
| Genetron ®141b | 30 | 1,1-dichloro-1-fluoroethane blowing agent |
| Catalyst | Varied | |
| Isocyanate Index | 450 | 44v20L, PMDI from Bayer |

Various Catalyst Mixtures were Tested:
Cat-A: 30% N, N-dimethylaminoethyl-N'-methyl-N'-ethanol+70% Cat-2
Cat-B: 30% N,N-dimethylaminoethoxyethanol+70% Cat-2
Cat-C: 30% 2-[N-(dimethylaminoethoxyethyl)-N-methylamino] ethanol+70% Cat-2
Cat-D: 30% N, N, N'-trimethyl-N'-3-aminopropyl-bis(aminoethyl) ether+70% Cat-2
Cat-E: 30% Dimethylaminopropylamine+70% Cat-2
Cat-F: 30% N, N-dimethylaminopropyl-N'-methyl-N'-ethanol+70% Cat-2
Cat-G: 30% N,N-dimethylaminopropyl-N',N'-bis(2-hydroxypropyl) amine+70% Cat-2

TABLE VII

Surface Curing: Sterically Hindered Salts Combined with Amines Having Isocyanate Reactive Groups
Surface hardness (Asker C) at different time point

|  | Time (s) after mixing | | | | |
|---|---|---|---|---|---|
|  | 60 | 90 | 120 | 150 | 180 |
| 4.8 pphp Cat-A | 35.0 | 69.0 | 75.0 | 77.0 | 77.0 |
| 5.0 pphp Cat-B | 27.5 | 64.0 | 71.5 | 74.0 | 77.0 |
| 4.8 pphp Cat-C | 15.0 | 60.0 | 71.0 | 75.0 | 79.0 |
| 5.8 pphp Cat-D | 19.0 | 60.0 | 74.0 | 76.0 | 78.0 |
| 5.6 pphp Cat-E | 17.5 | 61.0 | 69.0 | 75.0 | 78.0 |
| 5.0 pphp Cat-F | 17.0 | 62.0 | 73.0 | 75.0 | 78.0 |
| 5.2 pphp Caf-G | 17.5 | 63.0 | 70.0 | 74.0 | 77.0 |

TABLE VIII

Core Curing: Sterically Hindered Salts Combined with Amines Having Isocyanate Reactive Groups
Core Compressive Strength

|  | Time (min) after mixing | | | | |
|---|---|---|---|---|---|
|  | 4 | 5.25 | 6.5 | 7.75 | 9 |
| 4.8 pphp Cat-A | 427.88 | 439.16 | 459.12 | 504.31 | 560.14 |
| 5.0 pphp Cat-B | 391.00 | 393.00 | 418.12 | 468.32 | 527.13 |
| 4.8 pphp Cat-C | 259.33 | 332.29 | 377.43 | 413.00 | 432.56 |
| 5.8 pphp Cat-D | 353.23 | 402.65 | 448.27 | 451.36 | 504.00 |
| 5.6 pphp Cat-E | 260.40 | 294.21 | 314.15 | 354.93 | 417.96 |
| 5.0 pphp Cat-F | 375.96 | 387.99 | 443.61 | 452.86 | 496.68 |
| 5.2 pphp Caf-G | 319.24 | 386.06 | 423.24 | 440.67 | 442.69 |

From these results, N, N-dimethylaminoethyl-N'-methyl-N'-ethanol in combination with a sterically hindered carboxylate salt (TMAP) provided an effective combination for surface and core cure.

Example 4

Rate of Rise Profiles and Rate of Rise Speed of Sterically Hindered Carboxylate Salts Sterically hindered carboxylate salt Cat-1 prepared according to example 1 was used to make PIR/PUR rigid foam according to a standard formulation shown in Table IX and compared with two commonly know standards in the industry Dabco®K15 and Dabco®TMR. DABCO® K15 is a catalyst from Air Products and Chemicals, Inc. (APCI) is a 70% solution of an alkali metal carboxylate salt, potassium 2-ethylhexanoate (also known potassium octoate), in diethylene glycol. DABCO® TMR catalyst from APCI is a 75% solution of 2-hydroxypropyltrimethylammonium octoate in ethylene glycol.

TABLE IX

| Formulation | |
| --- | --- |
| COMPONENT | PARTS (weight) |
| Polyester Polyol | 100 |
| TCPP | 4.7 |
| Surfactant | 1.7 |
| Polycat ® 5 catalyst | 0.15 |
| n-Pentane | 17 |
| Trimer Catalyst | Varied |
| Isocyanate Index | Varied (250-500) |

Foam rate of rise and foam rise speed was measured using standard FOMAT sonar detector (Ultrasonic Fan Sensor LR 2-40 PFT) equipment. The FOMAT device comprises a sonar sensor that measures and records the height in millimeters (mm) of the rising foam sample versus time in seconds (s), directly after mixing all components of the formulation. The FOMAT standard software generates both height versus time plots and velocity versus time plots. These plots are useful for comparing the relative reactivity of different catalyst formulations. One suitable formulation for making PIR foam samples for ROR measurement by the FOMAT, including the relative amount of different components, is shown above (Table IX).

Referring now to FIG. 1, FIG. 1 shows the plots of foams height (mm) vs time (seconds) for Cat-1 together with standards Dabco®TMR and Dabco®K15. The curve for catalyst 1 has a slope that is more uniform than that of the DABCO® K15 but less uniform than DABCO TMR® catalyst. Hence, foam produced with inventive Cat-1 would show more consistent foam rise or foam expansion speed over time than Dabco®K15. This is a useful feature for continuous PIR/PUR foam operations, such as those involving lamination processes (e.g., as explained in Foamed Plastics (section 5.2.2.1 Rigid Foam Lamination) in Kirk-Othmer Encyclopedia of Chemical Technology. Copyright® John Wiley & Sons, Inc; hereby incorporated by reference).

Figure 2:
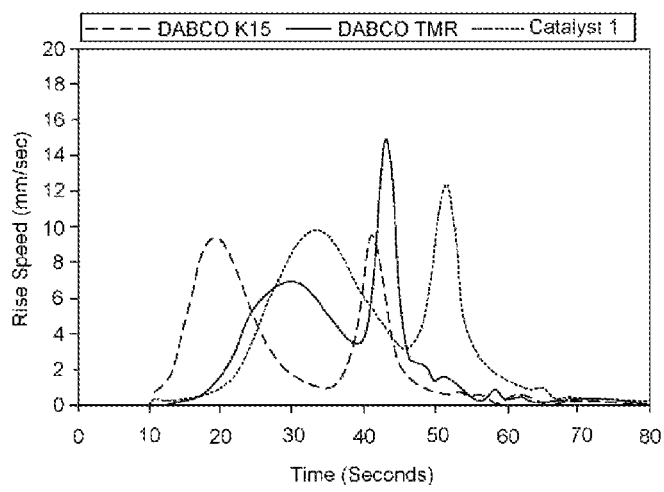
FIG. 2 is a plot of foam rise speed (mm/seconds) versus time (seconds) for a second foam produced in accordance with Example 4.

Referring now to FIG. 2, FIG. 2 illustrates the foam speed (mm/seconds) vs time (seconds) showing a small trimerization "step" with Cat-1 when compared with conventional salts such as potassium octoate (also known as potassium 2-ethylhexanoate). This is illustrated further by both the short and the shallow valley between the two peaks. Cat-1 offers a substantially consistent foam rise speed over a long time interval. This feature is highly desired in PIR/PUR foam production operations and further improvement of these feature are highly desired.

Example 5

Figure 3:
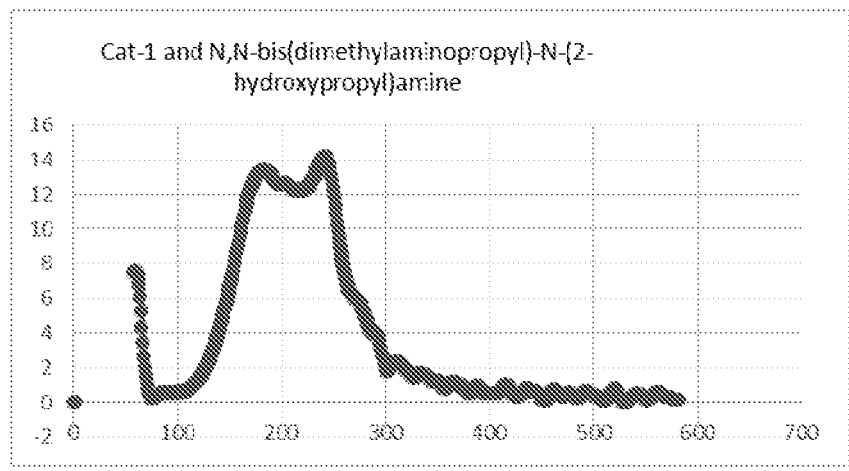
FIG. 3 is a plot of foam rise speed (mm/seconds) versus time (seconds) for a foam produced in accordance with Example 5.

Foam Speed of a Sterically Hindered Trimer Cat-1 in Combination with Isocyanate Reactive Amine Catalysts N,N-bis(dimethylaminopropyl)amine A mixture of catalysts according to formulation IX was used which consisted of 94% Cat-1 and 6% N,N-bis(dimethylaminopropyl)-N-(2-hydroxypropyl)amine and a 5.25 pphp use level. Referring now to FIG. 3, FIG. 3 illustrates foam speed (mm/seconds) versus time (seconds) for a foam made in accordance with Example 5.

Example 6

Figure 4:
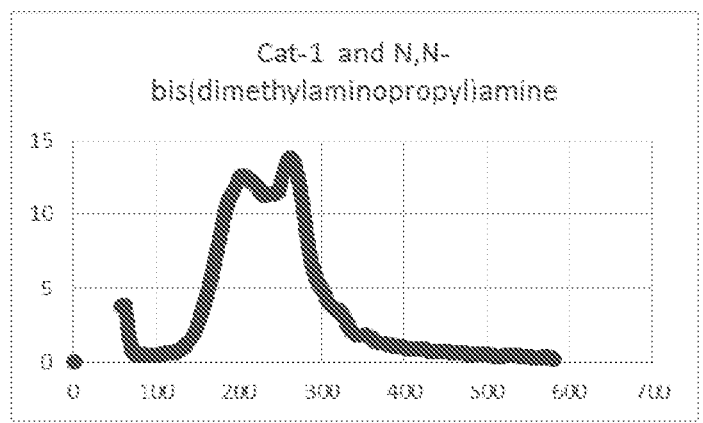
FIG. 4 is a plot of foam rise speed (mm/seconds) versus time (seconds) for a foam produced in accordance with Example 6.

Foam Speed of a Sterically Hindered Trimer Cat-1 in Combination with Isocyanate Reactive Amine Catalysts N,N-bis(dimethylaminopropyl)amine A mixture of catalysts was used which consisted of 90% Cat-1 and 10% N,N-bis(dimethylaminopropyl) and a use level of 5.4 pphp. Referring now to FIG. 4, FIG. 4 is a plot of foam speed (mm/seconds) vs time (seconds) for a foam produced in accordane with Example 6.

Example 7

Figure 5:
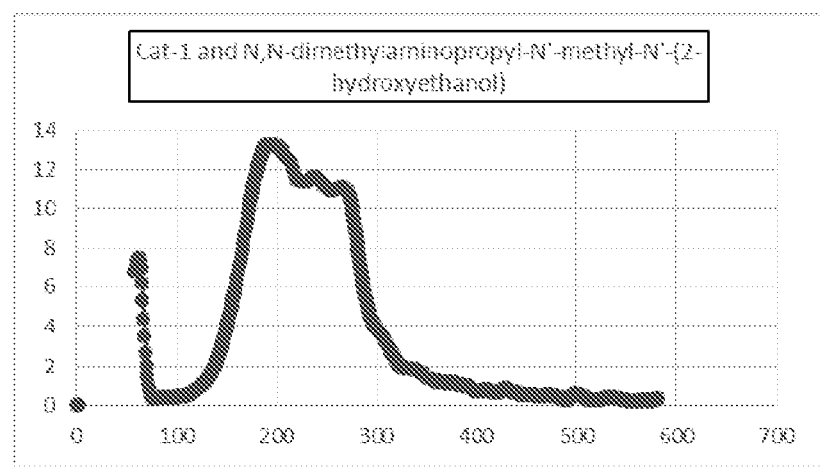
FIG. 5 is a plot of foam rise speed (mm/seconds) versus time (seconds) for a foam produced in accordance with Example 7.

Foam Speed of a Sterically Hindered Trimer Cat-1 in Combination with Isocyanate Reactive Amine Catalysts N,N-bis(dimethylaminopropyl)amine A mixture of catalysts according to formulation IX was used which consisted of 90% Cat-1 and 10% N,N-dimethylaminopropyl-N'-methyl-N'-(2-hydroxyethanol) and a use level of 5.25 pphp. Referring now to FIG. 5, FIG. 5 is a plot of foam speed (mm/seconds) vs time (seconds) for a foam produced in accordance with Example 7. Thus, when comparing the foam rise speed (mm/s) as a function of time is clear that two distinctive foam rise rates are observed when using Cat-1 as the sole catalyst as shown in example 4. Examples 5, 6 and 7 illustrates that when Cat-1 is used in combination with tertiary amines having at least one isocyanate group then a much smaller difference in foam speed is observed at the top of the curves which is helpful for improving the processability of continuous lamination lines. The smaller the differences in foam speed in the maximum foam speed region then the better foam product quality with minimal scrap and overpacking as well as optimum physical properties.

While the invention has been described with reference to certain aspects or embodiments, it will be understood by those skilled in the art that various changes may be made and equivalents may be substituted for elements thereof without departing from the scope of the invention. In addition, many modifications may be made to adapt the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising the contact product of:
 (a) at least one active hydrogen-containing compound;
 (b) a catalyst composition comprising a combination of (i) at least one sterically hindered carboxylate salt and (ii) at least one tertiary amine catalyst having at least one isocyanate reactive group comprising a member selected from the group consisting of primary hydroxyl group, a secondary hydroxyl group, a primary amine group, a secondary amine group, a urea group or an amide group; and (c) at least one blowing agent, with the proviso that the at least one blowing agent is not a chlorofluorocarbon;

wherein the at least one sterically hindered carboxylate salt has the formula:

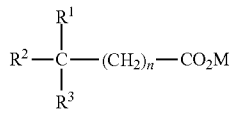

wherein $R^1$, $R^2$, and $R^3$ are selected independently from a $C_1$-$C_{18}$ alkyl, alkenyl, aryl, or aralkyl, any of which are substituted or unsubstituted;

wherein n is an integer from 0 to 10, inclusive; and wherein M is an alkali metal ion or a quaternary ammonium ion; and wherein the at least one tertiary amine catalyst is selected from the group consisting of N,N-dimethylaminoethyl-N'-methylethanolamine, N,N,N'-trimethylaminopropylethanolamine, N,N-dimethylethanolamine, N,N-diethylethanolamine, N,N-dimethyl-N',N'-2-hydroxy(propyl)-1,3-propylenediamine, (N,N-dimethylaminoethoxy)ethanol, methyl-hydroxy-ethyl-piperazine, bis(N,N-dimethyl-3-aminopropyl)amine, diethylaminopropyl urea, N,N'-bis(3-diethylaminopropyl)urea, bis(dimethylamino)-2-propanol, 6-dimethylamino-1-hexanol, N-(3-aminopropyl) imidazole, N-(2-hydroxypropyl) imidazole, N-(2-hydroxyethyl) imidazole, 2-[N-(dimethylaminoethoxyethyl)-N-methylamino]ethanol, N, N-dimethylaminoethyl-N'-methyl-N'-ethanol, dimethylaminoethoxyethanol, N,N,N'-trimethyl-N'-3-aminopropyl-bis(aminoethyl)ether, or a combination thereof.

2. The composition of claim 1, wherein $R^1$, $R^2$, and $R^3$ are selected independently from methyl, ethyl, propyl, butyl, pentyl, hexyl, heptyl, octyl, phenyl, tolyl, and benzyl.

3. The composition of claim 1, wherein M is an ion of lithium, potassium, sodium, or rubidium.

4. The composition of claim 1, wherein M is tetramethylammonium, tetraethylammonium, tetrapropylammonium, tetrabutylammonium, dimethyldiallyl-ammonium, trimethyl (2-hydroxypropyl)ammonium, triethyl(2-hydroxypropyl)ammonium, tripropyl(2-hydroxypropyl)ammonium, tributyl (2-hydroxypropyl)ammonium, trimethyl-(2-hydroxyethyl) ammonium, triethyl(2-hydroxyethyl)ammonium, tripropyl (2-hydroxyethyl)-ammonium, tributyl(2-hydroxyethyl) ammonium, dimethylbenzyl(2-hydroxypropyl)-ammonium, or dimethylbenzyl(2-hydroxyethyl)ammonium.

5. The composition of claim 1, wherein the at least one sterically hindered carboxylate salt is potassium pivalate, tetramethylammonium pivalate, 2-hydroxyl-propyltrimethylammonium pivalate, 2-hydroxylpropyltriethylammonium pivalate, tetraethylammonium pivalate, tetrapropylammonium pivalate, tetrabutylammonium pivalate, dimethyldiallylammonium pivalate, potassium triethylacetate, tetramethyl-ammonium triethylacetate, 2-hydroxylpropyltrimethylammonium triethylacetate, 2-hydroxylpropyltriethylammonium triethylacetate, tetraethylammonium triethylacetate, tetrapropylammonium triethylacetate, tetrabutylammonium triethylacetate, potassium neoheptanoate, tetramethylammonium neoheptanoate, 2-hydroxylpropyltrimethyl-ammonium neoheptanoate, 2-hydroxylpropyltriethylammonium neoheptanoate, tetraethylammonium neoheptanoate, tetrapropylammonium neoheptanoate, tetrabutyl-ammonium neoheptanoate, potassium neooctanoate, tetramethylammonium neooctanoate, 2-hydroxylpropyltrimethylammonium neooctanoate, 2-hydroxylpropyl-triethylammonium neooctanoate, tetraethylammonium neooctanoate, tetrapropyl-ammonium neooctanoate, tetrabutylammonium neooctanoate, potassium neodecanoate, tetramethylammonium neodecanoate, 2-hydroxylpropyltrimethylammonium neodecanoate, 2-hydroxylpropyltriethylammonium neodecanoate, tetraethylammonium neodecanoate, tetrapropylammonium neodecanoate, tetrabutylammonium neodecanoate, or any combination thereof.

6. The composition of claim 1, wherein the at least one sterically hindered carboxylate salt is a salt of pivalic acid, triethylacetic acid, neohexanoic acid, neoheptanoic acid, neooctanoic acid, neodecanoic acid, neoundecanoic acid, neododecanoic acid, or any combination thereof.

7. The composition of claim 1, wherein the at least one blowing agent is water, methylene chloride, acetone, a hydrocarbon, or any combination thereof.

8. The composition of claim 1, wherein the at least one blowing agent is n-pentane, iso-pentane, cyclopentane, or any combination thereof.

9. The composition of claim 1, wherein the at least one active hydrogen-containing compound is at least one polyether polyol, at least one polyester polyol, or any combination thereof.

10. The composition of claim 1, further comprising at least one alkali metal α,β-unsaturated carboxylate salt, at least one alkali metal carboxylate salt, at least one alkaline earth metal α,β-unsaturated carboxylate salt, at least one alkaline earth metal carboxylate salt, at least one quaternary ammonium α,β-unsaturated carboxylate salt, or at least one quaternary ammonium carboxylate salt, or any combination thereof.

11. The composition of claim 1, further comprising at least one urethane catalyst.

12. The composition of claim 1, wherein the catalyst composition comprising at least one sterically hindered carboxylate salt is thermally stable at a temperature up to about 150° C.

13. A method for preparing a polyisocyanurate/polyurethane foam which comprises contacting at least one polyisocyanate with at least one active hydrogen-containing compound, in the presence of at least one blowing agent and an effective amount of a catalyst composition comprising a combination of (i) at least one sterically hindered carboxylate salt and (ii) at least one tertiary amine catalyst having at least one isocyanate reactive group comprising a member selected from the group consisting of primary hydroxyl group, a secondary hydroxyl group, a primary amine group, a secondary amine group, a urea group or an amide group;

wherein the at least one blowing agent is not a chlorofluorocarbon;

wherein the at least one sterically hindered carboxylate salt has the formula:

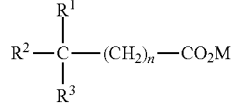

wherein $R^1$, $R^2$, and $R^3$ are selected independently from a $C_1$-$C_{18}$ alkyl, alkenyl, aryl, or aralkyl, any of which are substituted or unsubstituted;

wherein n is an integer from 0 to 10, inclusive; and wherein M is an alkali metal ion or a quaternary ammonium ion; and wherein the at least one tertiary amine catalyst is selected from the group consisting of N,N-dimethylaminoethyl-N'-methylethanolamine, N,N,N'-trimethylaminopropylethanolamine, N,N-dimethylethanolamine, N,N-diethylethanolamine, N,N-dimethyl-N',N'-2-hydroxy(propyl)-1,3-propylenediamine, (N,N-dimethylaminoethoxy)ethanol, methyl-hydroxy-ethyl-piperazine, bis(N,N-dimethyl-3-aminopropyl)amine, diethylaminopropyl urea, N,N'-bis(3-diethylaminopropyl)urea, bis(dimethylamino)-2-propanol, 6-dimethylamino-1-hexanol, N-(3-aminopropyl) imidazole, N-(2-hydroxypropyl) imidazole, N-(2-hydroxyethyl) imidazole, 2-[N-(dimethylaminoethoxyethyl)-N-methylamino]ethanol, N, N-dimethylaminoethyl-N'-methyl-N'-ethanol, dimethylaminoethoxyethanol, N,N,N'-trimethyl-N'-3-aminopropyl-bis(aminoethyl)ether, or a combination thereof.

14. The method of claim 13, further comprising the presence of at least one urethane catalyst.

15. The method of claim 13, wherein the catalyst composition comprising the at least one sterically hindered carboxylate salt is present in an amount from about 0.05 to about 10 parts by weight per hundred weight parts of the at least one active hydrogen-containing compound.

16. A method for preparing a polyisocyanurate/polyurethane foam comprising
(a) forming a premix comprising:
  i) at least one polyol;
  ii) about 10 to about 80 parts by weight per hundred weight parts of the polyol (pphp) blowing agent, with the proviso that the blowing agent is not a chlorofluorocarbon;
  iii) about 0.5 to about 10 pphp silicon surfactant;
  iv) zero to about 10 pphp water;
  v) zero to about 50 pphp flame retardant;
  vi) zero to about 10 pphp urethane catalyst; and
  vii) about 0.05 to about 10 pphp of a catalyst composition comprising a combination of at least one sterically hindered carboxylate salt and at least one tertiary amine catalyst having at least one isocyanate reactive group comprising a member selected from the group consisting of primary hydroxyl group, a secondary hydroxyl group, a primary amine group, a secondary amine group, a urea group or an amide group; and
(b) contacting the premix with at least one polyisocyanate at an Isocyanate Index from about 80 to about 800;

wherein the at least one sterically hindered carboxylate salt has the formula:

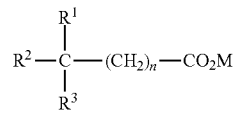

wherein $R^1$, $R^2$, and $R^3$ are selected independently from a $C_1$-$C_{18}$ alkyl, alkenyl, aryl, or aralkyl, any of which are substituted or unsubstituted;

wherein n is an integer from 0 to 10, inclusive; and wherein M is an alkali metal ion or a quaternary ammonium ion; and wherein the at least one tertiary amine catalyst is selected from the group consisting of N,N-dimethylaminoethyl-N'-methylethanolamine, N,N,N'-trimethylaminopropylethanolamine, N,N-dimethylethanolamine, N,N-diethylethanolamine, N,N-dimethyl-N',N'-2-hydroxy(propyl)-1,3-propylenediamine, (N,N-dimethylaminoethoxy)ethanol, methyl-hydroxy-ethyl-piperazine, bis(N,N-dimethyl-3-aminopropyl)amine, diethylaminopropyl urea, N,N'-bis(3-diethylaminopropyl)urea, bis(dimethylamino)-2-propanol, 6-dimethylamino-1-hexanol, N-(3-aminopropyl) imidazole, N-(2-hydroxypropyl) imidazole, N-(2-hydroxyethyl) imidazole, 2-[N-(dimethylaminoethoxyethyl)-N-methylamino]ethanol, N,N-dimethylaminoethyl-N'-methyl-N'-ethanol, dimethylaminoethoxyethanol, N,N,N'-trimethyl-N'-3-aminopropyl-bis(aminoethyl)ether, or a combination thereof.

* * * * *